Nov. 1, 1949.   E. F. HAGER   2,486,645
TOOLMAKER'S OPTICAL INSTRUMENT HAVING MOUNTING
FEATURES AND SCALE GRADUATIONS
Filed May 18, 1945    4 Sheets-Sheet 1

INVENTOR.
EMIL F. HAGER
BY Percy P. Lantzy
ATTORNEY

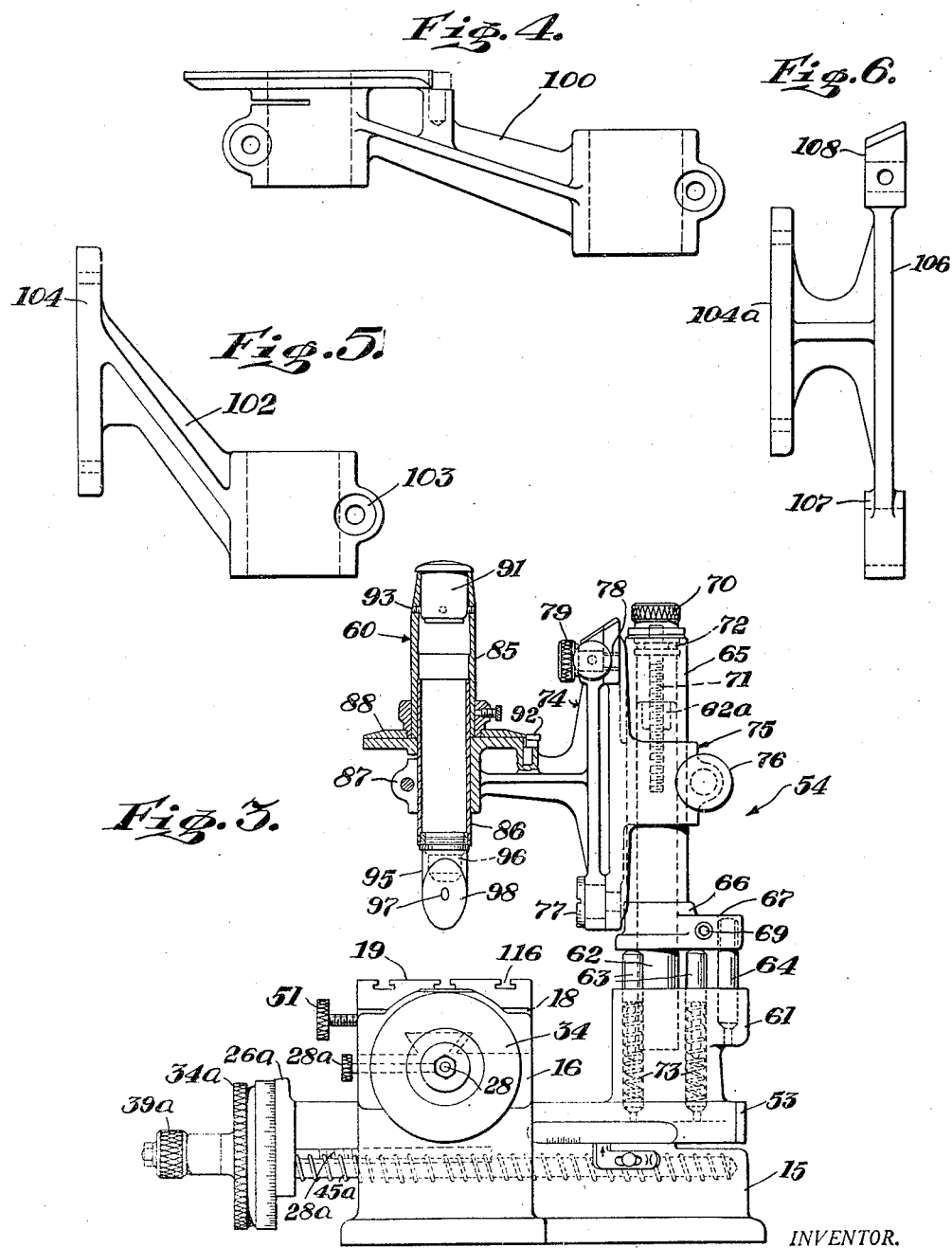

Nov. 1, 1949.   E. F. HAGER   2,486,645
TOOLMAKER'S OPTICAL INSTRUMENT HAVING MOUNTING
FEATURES AND SCALE GRADUATIONS
Filed May 18, 1945   4 Sheets-Sheet 3
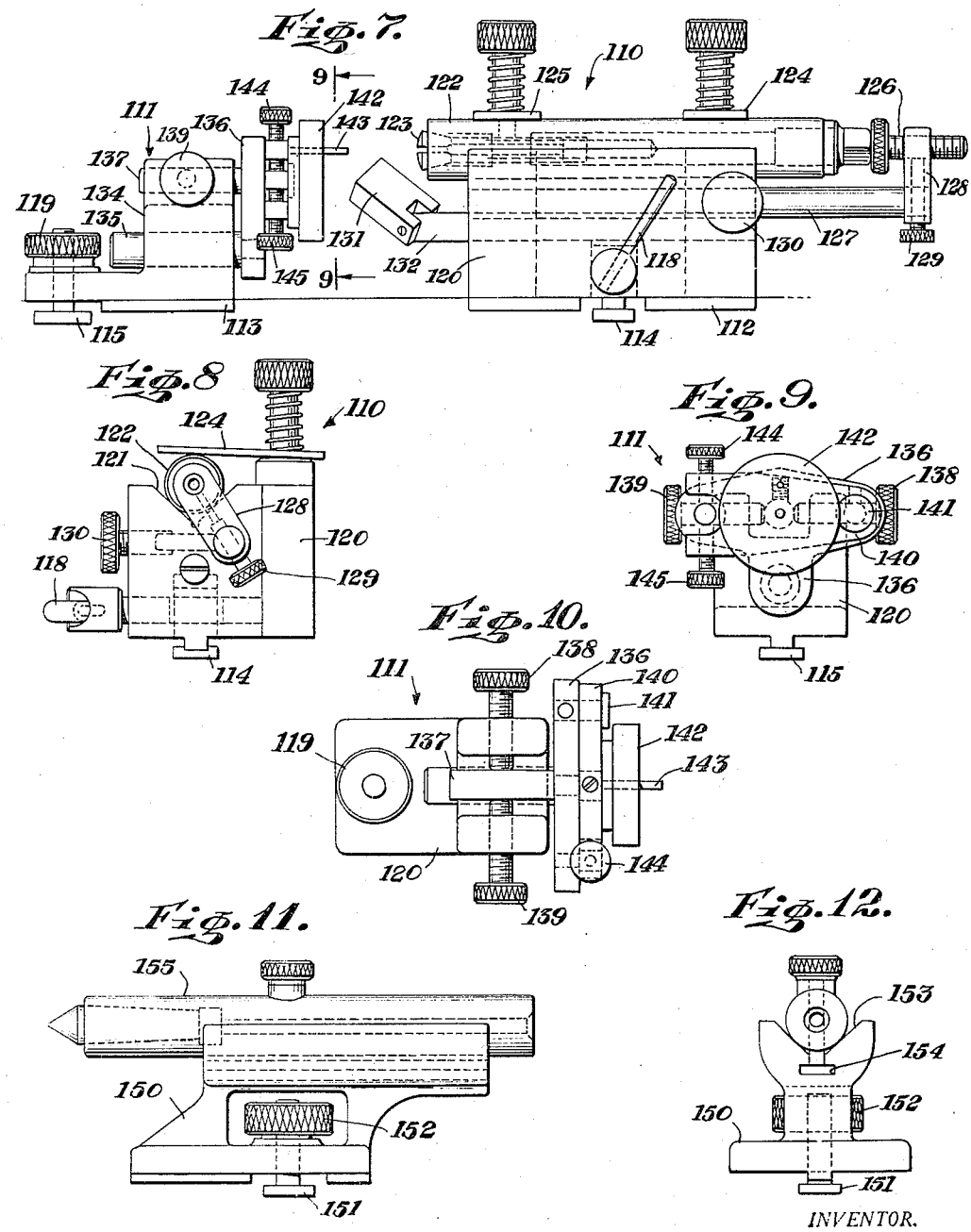
INVENTOR.
EMIL F. HAGER
BY
Percy P. Lantry
ATTORNEY

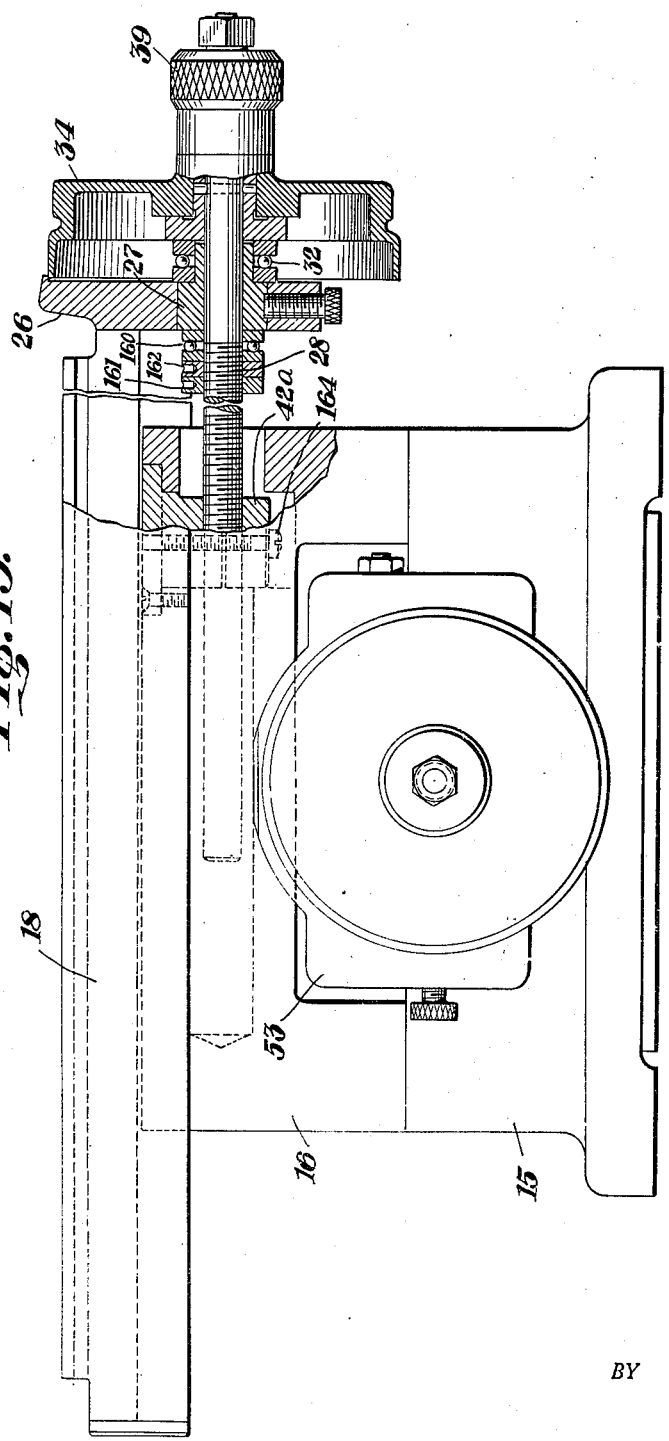

Patented Nov. 1, 1949

2,486,645

UNITED STATES PATENT OFFICE 2,486,645

TOOLMAKER'S OPTICAL INSTRUMENT HAVING MOUNTING FEATURES AND SCALE GRADUATIONS

Emil F. Hager, Queens Village, N. Y.

Application May 18, 1945, Serial No. 594,451

3 Claims. (Cl. 88—39)

This invention relates to microscope apparatus and more particularly to a toolmakers' optical measuring instrument.

It is an object of this invention to provide improved optical apparatus for measuring screw threads, gear teeth, distances, angular relations, etc. of tools and parts for precision instruments, watches and the like.

Another object is to provide an improved table or stage arrangement for optical measuring apparatus capable of fine adjustments along coordinate axes and in angular directions.

Additional objects of the invention are to provide a table and instrument supporting column arrangement whereby coordinate and angular adjustments of the table relative to the column can be made; to provide a column adjustable relative to the table; to provide improved instrument supporting brackets for swivel, rotary and sliding adjustments; and to provide an improved microscope of relatively simple construction having various adjustments to facilitate measurement of work of various shapes.

For a better understanding of the above and other objects of the invention reference is made to the following detailed description and the accompanying drawings of a preferred embodiment of the invention in which:

Fig. 3 is a side view in elevation of the optical measuring instrument with the microscope tube and an associated protractor shown in section;

Figs. 4, 5 and 6 are views in side elevation of supporting brackets that can be used for various purposes in conjunction with the table and column arrangement of the embodiment shown in Figs. 1, 2 and 3;

Fig. 7 is a view in side elevation of an adjustable center support for tools and other work to be measured and/or worked upon;

Fig. 8 is an end view of the support of Fig. 7 viewed from the right hand side thereof;

Fig. 9 is a view of the left hand portion of the center support as viewed from line 9—9 of Fig. 7;

Fig. 10 is a plan view of the left hand. adjustment member of Fig. 7;

Figs. 11 and 12 are side and end elevational views of a block attachment for use on the table of the optical measuring instrument; and Figs. 13, 14 and 15 show details of an alternative embodiment of the invention.

Figure 1:
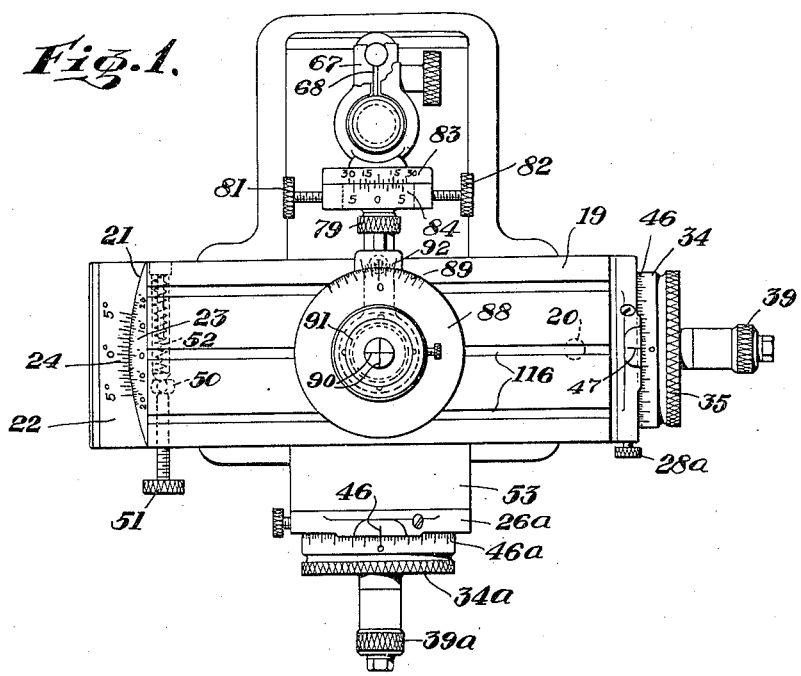
Fig. 1 is a plan view of the optical measuring instrument according to this invention.
Figure 2:
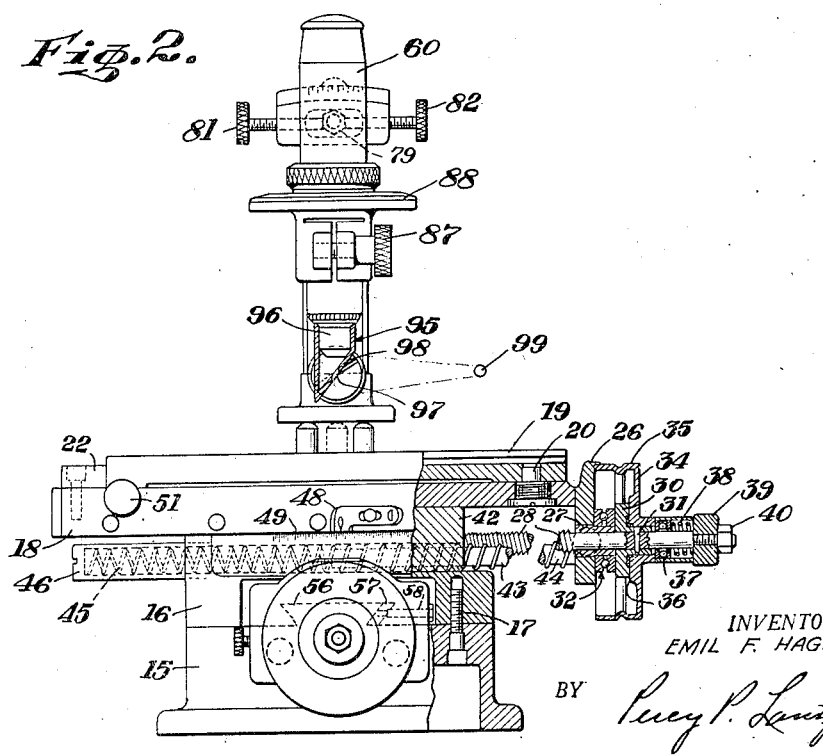
Fig. 2 is a front view in elevation of the instrument with parts broken away and in section to show the construction and adjustment features of the table.

Referring to Figs. 1, 2 and 3 of the drawings, the optical measuring instrument, according to a preferred embodiment of my invention, includes a base composed of a bottom part 15, and an upper inverted U-shaped portion 16 secured together by screws counter sunk as indicated at 17, Fig. 2. Mounted for sliding movement in a dovetailed relationship with the top surface of the base part 16 is a carriage 18 which carries thereon a table top 19 (see Figs. 2 and 3). The table top is pivoted at one end on the carriage 18 as indicated at 20. The opposite end of the table 19 is curved as indicated at 21, Fig. 1, to permit the table top to be adjusted for angular positions relative to the end plate 22 which is likewise curved. Along the curved portions of the table top and the end plate are graduations 23 and 24 by which angular adjustments of the table may be determined with a high degree of accuracy.

In order to provide for lengthwise adjustment of the table 19, the carriage 18 is secured to an end plate 26 which is mounted on a sleeve 27 carried by a spindle 28. At the outer end of the sleeve 27 is a clutch disc 30 keyed at 31 to the spindle 28. Interposed between the clutch and the end plate 26 is a thrust bearing 32. Supported in coactive relation with clutch disc 30 is a large cup shaped actuating member 34 provided with a knurled portion 35, Figs. 1 and 2, to facilitate manual adjustment of the table. The member 34 is provided with a disc surface 36 for coaction with the clutch disc 30. The surface 36 of member 34 is urged into engagement with the clutch disc 30 by thrust bearing 37 and spring 38, the latter being held in place on spindle 28 by a knurled collar or knob 39 locked to the shaft and held thereon by a threaded nut 40.

The spindle 28 is threaded for reception in a threaded block 42 carried on base member 16. Arranged in parallel relation to the spindle 28 is a pair of pins 43 and 44 received in tubular openings contained in the base member 16, the pins 43 and 44 being surrounded by retraction springs as indicated at 45. Each retraction spring may be adjusted for the desired tension by a tubular member 46 threadably received in the opening containing the spring.

It will be clear from the foregoing description that turning movement either by engaging collar 39 or the knurled portion 35 of the member 34, the carriage 18 and the associated table 19 may be adjusted to the left or right as viewed in Figs.

1 and 2. The retraction springs 45 maintain the table biased in one direction to avoid backlash between the threads of the spindle 28 and the nut 42. Screw 28a engages spindle 28 for locking of the carriage in a desired position.

To provide a measurement of change in carriage position, the member 34 is graduated at 46 for cooperation with an index 47, Fig. 1. In addition, I provide the carriage 18 with an adjustable index 48 for cooperation with graduations 49 on the base member 16. For any position of the carriage the index 48 may be adjusted to a desired division mark of graduations 49 and the member 34 may be retracted against spring 37 and turned relative to catch disc 30 until the zero mark is opposite the index 46.

The table top 19 is provided with a depending lug 50, Fig. 3, engageable on one side by a thumb screw 51 threadably engaged in the carriage 18, and on the opposite side by a retraction spring arrangement 52 contained in a bore in the carriage structure. By adjusting thumb screw 51 the table top may be adjusted to the desired angle relative to the carriage.

As shown in Fig. 2, the base members 15 and 16 provide space for a moveable base support or carriage 53 for a column 54. The carriage 53 extends through the space provided between the legs of member 16 and is slideably engaged in dovetailed manner with the base member 15 as indicated at 56. In order to provide a tight dovetail relationship a side piece 57 is adjustably held in desired engagement with the inner dovetail portion by screw 58. The support 53 is provided with an end plate 26a and manually adjustable members 34a and 36a similarly as provided for the carriage 18 as viewed in Fig. 2. The support 53 is likewise provided with a threaded spindle 28a and retraction springs 45a contained in bores in the base member 15, Fig. 3. By adjustment of member 34a, for example, the carriage 53 and the column 54 carried thereby may be adjusted crosswise with respect to the table top 19, thereby adjusting the microscope 60 relative to the table.

The column 54 includes an upright member 61 which carries a post 62 and a plurality of spring urged pins 63 and a truing pin 64. Slideably received on the post 62 is a tubular sleeve 65, the lower end of which is provided with a flange member 66 against which pins 63 bear. The flange 67 of member 66 is split as indicated at 68, Fig. 1, and includes a circular cut-out to receive the pin 64. The split portions of the flange 67 are caused to grip the pin 64 by tightening screw 69, Fig. 3. The lower end of pin 64 is slideably received in a bore in member 61 whereby the sleeve 65 is locked against rotary movement.

It is quite often desirable to make small vertical adjustment of the microscope or other instrumentalities carried by the sleeve 65. I have provided a thumb adjustment member 70 at the top of the post secured to a spindle 71 threadably engaged in a bore or a threaded piece 62a in the bore of the post 62. Interposed between the member 70 and the member 65 is a thrust bearing 72. The pins 63 are provided with springs 73 of sufficient strength to support the sleeve 65 and any instrumentalities thereon so as to resiliently urge the tubular member against the thrust bearing 72. By turning the member 70 the sleeve 65 can be adjusted vertically as desired.

The microscope 60 is shown to be supported in Figs. 1, 2 and 3 by a swivel bracket combination comprising a bracket part 75 clamped in desired position on the sleeve 65 by tightening thumb screw 76. The bracket 75 is provided with a pivot pin 77 at its lower end and a threaded opening 78 at its upper end for reception of a thumb screw 79. Pivoted on the pin 77 is the swivel bracket 74 which is provided with two thumb screws 81 and 82 disposed at right angles to the thumb screw 79. By adjusting thumb screws 81 and 82 against screw 79 the bracket 74 can be tilted at an angle to the vertical, the upper end of the bracket members 74 and 75 being graduated as indicated at 83 and 84, Fig. 1. Thus the microscope may not only be adjusted vertically by thumb screw 70 and transverse of the table 19 by actuating member 34a but may also be tilted at an angle to the vertical by manipulating thumb screws 81 and 82.

The microscope 60 has several unique features including the simplicity of construction and the means for effecting certain adjustments. The microscope includes two tubular sections 85 and 86 telescoped together, the lower section 86 being clamped in the bracket 74 as indicated at 87, Figs. 2 and 3. To the upper section 85 is keyed a protractor disc 88 which is graduated as indicated at 89 for measuring the angular position of the crosshairs 90 of the eye piece 91, Figs. 1 and 3. The scale 89 is read with respect to the vernier scale 92 supported on bracket 74. The eye piece 91 may be adjusted for centering the crosshair by means of four set screws 93 contained in space relation in the upper section 85.

In order to provide proper light directly down upon the tool or other work being viewed on table 19 I provide a reflector attachment 95 which is tubular for sliding attachment onto the circular portion of the objective 96. The lower end of the reflector 95 is closed, except for a small opening 97, by an inclined end portion 98. By placing a light source 99 to one side of the reflector 95 the light rays directed onto the surface of portion 98 will be reflected onto the work disposed below the objective. The reflector 95 is preferably metal which may be highly polished for efficient reflection.

In place of the swivel bracket combination 74, 75 a simpler bracket 100, Fig. 4, may be used.

In place of the microscope 60 certain known forms of microscopes may be employed, in which case a simple bracket 102, Fig. 5, may be used. This type of bracket may be clamped by thumb screw 103 to the sleeve 65 while the microscope is secured by bolts or other means to the vertical plate portion 104. This bracket may be clamped in vertically adjusted position on the column 54 without the provision of the swivel arrangement provided by the bracket combination 74, 75.

If it is desired, a swivel bracket may be provided for known forms of microscopes such as may be used with bracket 102. That is to say, a bracket 106 may be provided, having an attachment plate 104a similar to that of bracket 102, Fig. 5, and swivel connections 107, 108 similar to the swivel connections of bracket 74. The bracket 106 of course will be used in conjunction with bracket 75.

In Figs. 7 to 10 I show a form of work support to be used on the table 19 of the microscope apparatus shown in Figs. 1, 2 and 3. The work support includes two members 110 and 111 each having depending portions 112, 113, and locking members 114, 115 for reception in the flanged slots 116 in the top of table 19. The locking members 114 and 115 are provided with actuatable members 118 and 119 whereby, either operating on a cam principle or screw thread principle, whereby actuation thereof locks the work support to the table. It will be clear that the supports 110 and 111 are shiftable along the slots 116 to the desired position before locking.

The support 110 includes a base member 120 provided with a triangular groove 121 for receiving a tube 122 having jaws 123 to grip the work to be measured. The tube 123 is clamped by spring held members 124 and 125 in the groove 121. The tube 122 is retained in the desired position and adjusted slight amounts by means of a threaded member 126 supported from the base 120 by an adjustable rod 127 and a connecting link 128 provided with screw 129 by which the threaded member 126 may be locked. The rod 127 may likewise be locked by screw 130. The member 110 includes a light reflector 131 pivotally carried on a rod 132 supported by the base 120. Thus the reflector directs light from an adjacent source onto the work held by the jaws 123.

The member 111 is sometimes necessary to support the opposite ends of the work by the jaws 123. This is particularly necessary where it is desirable to adjust the work at various angles or to center the work. The member includes a base 134 which slideably supports rod 135 for sliding and rotary movement. The rod 135 supports a plate 136 which also has an upper pin member 137 disposed parallel to the rod 135. The base 134 has a pair of oppositely disposed thumb screws 138 and 139 which engage pin 137 to determine the pivoted position of plate 136. The plate 136 pivotally supports a second plate 140 by pin 141 which in turn carries a face plate 142 thru which extends work supporting pin 143. The second plate 140 is adjustable about pin 141 by screws 144 and 145, Figs. 7, 9 and 10.

From the foregoing description of Figs. 7 to 10 it will be clear that any work supported at one end by jaws 123 of member 110 may be adjusted at its opposite end in a vertical direction by adjustment screws 144, 145 and adjusted laterally by screws 138, 139.

In Figs. 11 and 12 I show a V block attachment for use on the table 19, Figs. 1, 2 and 3. The base of the attachment 150 includes a lock means 151, 152 for coaction with groove 116 of the table. The apex of the V groove 153 is shaped to include a flanged groove 154 by which a further attachment having a similar locking lug may be secured thereto. As shown, a centering element 155 is locked in the groove 154 of the attachment.

In Figs. 13, 14 and 15 I show an alternative embodiment of the invention wherein the means for effecting lengthwise adjustment of carriage 18 includes a lead screw nut 42a adjustable to minimize axial play of spindle 28. In addition, a thrust bearing 160 is held on the spindle by a pair of elements 161 and 162 threadably received on the spindle. The bearing 160 is urged against the sleeve 27 in opposition to the bearing 32. This insures proper mounting of the end plate 26 on the spindle 28.

Referring more particularly to Figs. 14 and 15 it will be noted that the nut 42a is split as indicated at 163 and is provided with a screw 164 interconnecting the split portions, whereby adjustment of the screw tightens the nut upon the threads of the spindle 28. By proper adjustment of the screw 164 relative axial movement or backlash between the threads of spindle 28 and nut 42a may be substantially avoided, thus eliminating the need for the pins 43, 44 and retraction springs 45 included in the embodiment shown in Figs. 1, 2 and 3. In Fig. 13 the carriage 18 and the supporting base therefor is shown without any retraction springs. The movement of the carriage in either direction is controlled by the turning force applied to members 34 and 39.

It will be understood, however, that if desired the retraction spring arrangement shown in Fig. 2 may be included along with the spindle mounting arrangement shown in Fig. 13, the force of the springs operating in conjunction with the lead screw nut 42a to remove relative axial play between spindle 28 and the nut 42a.

It will be clear that while the nut 42a and opposed bearing arrangement 32, 160 have been shown in connection with carriage 18, substantially the same arrangement may be provided for the spindle of carriage 53; and if desired, this same bearing and split nut arrangement may be provided for the spindle 71 of the column 54, Fig. 3. In such case the retraction springs 73 would preferably be included to counter-balance at least part of the weight of sleeve 65 and attachments applied to the sleeve.

While I have shown two preferred embodiments of the optical measuring instrument together with various forms of bracket attachments and work supporting attachments, it will be clear to those skilled in the art that many variations of the optical instrument, the adjustable carriage arrangement thereof, the supporting brackets and the work supporting attachments, may be made without departing from my invention. It should be understood therefore that the apparatus herein shown and described is illustrative of the invention only and is not to be regarded as limiting the scope of the invention as set forth in the objects and the appended claims.

I claim:

1. In measuring apparatus, a base comprising a bottom part and an upper part shaped to provide an opening therebetween, a first carriage mounted on said upper part for movement in a direction transverse to said opening, a second carriage mounted for movement lengthwise in said opening, and an instrument supporting column disposed to the rear of said first carriage and carried by said second carriage, each carriage having a threaded spindle, threaded members carried by said base to receive the threaded portion of each spindle, a sleeve on each spindle secured to said carriage, a first clutch disk secured to said spindle, a second clutch disk rotatably mounted on said spindle, a knob secured to said spindle and a thrust bearing and spring arrangement disposed between said knob and said second disk to cause the latter to resiliently engage said first disk said sleeve and said second clutch being disposed adjacent each other with calibrations on one for measuring relative movement therebetween, said second disk being turnable independent of said spindle for zero setting purposes and adapted to be driven by said first clutch disk upon turning movement of said spindle to measure change in position of said carriages.

2. In measuring apparatus, a base, a carriage mounted for movement on said base, a threaded spindle carried by said carriage, a threaded member on said base to receive the threaded portion of said spindle, a sleeve on said spindle secured to said carriage, a first clutch disk secured to said spindle, thrust bearing means disposed between said sleeve and said first clutch disk, a second clutch disk rotatably mounted on said spindle adjacent said sleeve, calibrations for measuring rotary movement of said second clutch disk relative to said sleeve, a knob adapted to be secured to said spindle and a thrust bearing and spring arrangement disposed between said knob and said second disk to cause the latter to resiliently engage said first disk, whereby said second disk may be turned independently of said spindle for zero setting and to be driven by said spindle to indicate change in position of said carriage when said spindle is turned.

3. In measuring apparatus, a base, a carriage mounted for movement on said base, a threaded spindle carried by said carriage, a threaded member carried by said base to receive the threaded portion of said spindle, a sleeve on said spindle secured to said carriage, a first clutch disk secured to said spindle, a second clutch rotatably mounted on said spindle, a knob adapted to be secured to said spindle and resilient means disposed between said knob and said second disk to cause the latter to engage said first disk, said sleeve being provided with an index and said second clutch disk being provided with an annular rim adjacent said sleeve with calibrations thereon to measure the rotary position of said second disk with respect to the index on said sleeve, whereby said second disk may be adjusted independently of said spindle to zero position with respect to said index and rotated relative thereto upon turning movement of said spindle.

EMIL F. HAGER.

REFERENCES CITED

The following references are of record in the file of this patent:

UNITED STATES PATENTS

| Number | Name | Date |
|---|---|---|
| 275,434 | Stokes | Apr. 10, 1883 |
| 287,420 | Darling | Oct. 30, 1883 |
| 319,146 | Stokes | June 2, 1885 |
| 703,047 | Dieckmann | June 24, 1902 |
| 895,093 | Knight | Aug. 4, 1908 |
| 936,667 | Reynolds | Oct. 12, 1909 |
| 1,080,968 | Hayes | Dec. 9, 1913 |
| 1,281,035 | Levy | Oct. 8, 1918 |
| 1,293,202 | Roesler | Feb. 4, 1919 |
| 1,467,403 | Tooney | Sept. 11, 1923 |
| 1,498,159 | Ehringhaus | June 17, 1924 |
| 1,755,759 | Ahmels et al. | Apr. 22, 1930 |
| 2,003,387 | Ott | June 4, 1935 |
| 2,031,097 | Bucky | Feb. 18, 1936 |
| 2,110,958 | Lindner | Mar. 15, 1938 |
| 2,119,354 | Riepert | May 31, 1938 |
| 2,171,028 | Gelb | Aug. 29, 1939 |
| 2,228,906 | Bowen | Jan. 14, 1941 |
| 2,237,943 | Lihotzky | Apr. 8, 1941 |
| 2,325,239 | Flint | July 27, 1943 |
| 2,387,440 | Guellich et al. | Oct. 23, 1945 |
| 2,410,559 | West et al. | Nov. 5, 1946 |

FOREIGN PATENTS

| Number | Country | Date |
|---|---|---|
| 138,943 | Great Britain | Feb. 26, 1920 |